Feb. 18, 1964 M. J. BOURGI 3,121,575
BICYCLE DRIVE APPARATUS
Filed Feb. 26, 1962

INVENTOR.
Mario J. Bourgi
BY
*Irving Seidman*
ATTORNEY 3,121,575
BICYCLE DRIVE APPARATUS
Mario J. Bourgi, 135—30 Grand Central Parkway,
Kew Gardens, N.Y.
Filed Feb. 26, 1962, Ser. No. 175,735
3 Claims. (Cl. 280—236)

Whether bicycling for racing or for pleasure, many varied types of terrain and ground are covered. Because of the various conditions encountered, hills and flat ground, hard and soft surfaces, no one single arrangement of bicycle drive means is available which will provide satisfactory performance at all times. In the past multiple speed gear mechanisms, of which the three speed gear is the most common, have been used to meet these various conditions. In addition, and particularly in Europe, multiple crank sprocket wheels have been used to achieve the same effect as the multiple speed gears. One of the problems with the multiple crank sprocket wheels is that for at least a portion of the time the chain is not in line, this problem of course increases in severity with the number of crank sprocket wheels employed. Further with the multiple crank sprocket wheels the chain must have a circumference great enough to accommodate the sprocket wheel having the largest diameter. In turn there must be some provision to take up the slack in the chain when it is being driven by one of the smaller diameter sprocket wheels.

It is, therefore, an object of this invention to combine a multiple speed gear mechanism with a multiple crank sprocket wheel arrangement so that the optimum features of each can be achieved while avoiding the problems which arise when trying to achieve a great variety of speeds using only one of these means.

Another object is to provide a bicycle capable of multiple speed operation, as on the order of six speeds, while maintaining a simplicity of construction and operation.

A further object is to provide an arrangement by which the chain may be easily and simply shifted from one size crank sprocket wheel to another. These and other objects will become apparent from the description of the invention.

Therefore, the invention comprises a bicycle having a multiple speed gear mechanism located in the hub of the rear wheel. In combination with the gear mechanism a multiple sprocket wheel is mounted on the crank with a shift lever on the support post beneath the seat for selectively positioning the chain on the desired sprocket wheel. In this arrangement the number of speeds attainable is determined by multiplying the number of crank sprocket wheels by the number of speeds in the multiple speed gear mechanism.

Further the invention provides a simple arrangement whereby slack is kept out of the chain regardless of the crank sprocket wheel with which it is engaged.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

Figure 1:
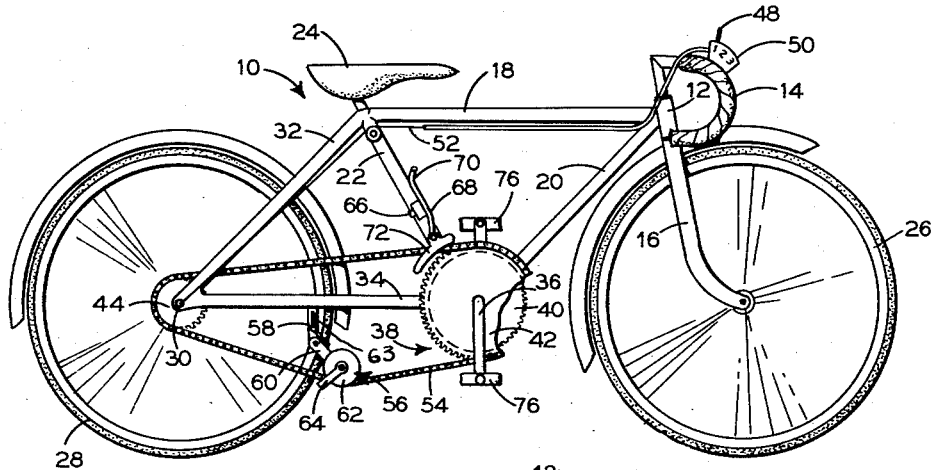
FIG. 1 is a side view of a bicycle embodying the present invention.

In FIG. 1 a racing model bicycle 10 is illustrated embodying the invention, however, the invention is also equally applicable to the more commonly used standard model bicycles. The bicycle 10 has a frame comprising a head member 12 with a handlebar 14 mounted in its upper end and a front fork 16 extending downwardly from its lower end. Connected to the head member 12 are a top member 18 and a bottom member 20 which extend at their opposite ends to a seat support member 22 which supports a seat or saddle assembly 24. Within the frame are mounted a front wheel 26 in the front fork 16 and a rear wheel 28. The rear wheel has a hub 30 to which are connected a back stay 32 extending from the upper end of the seat support member 22 and chain stays 34 extending from the lower end of the seat support member.

Figure 2:
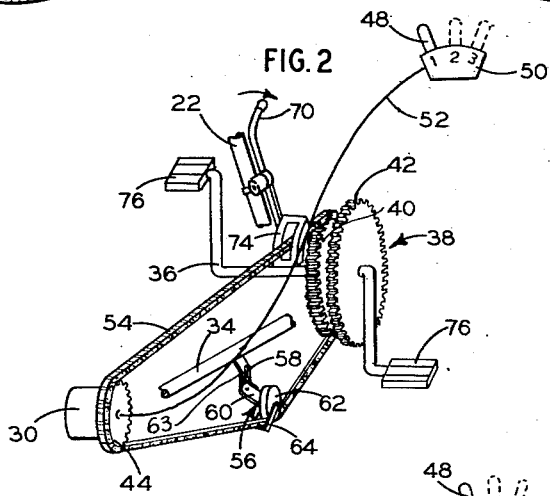
FIGS. 2 and 3 are somewhat schematic perspective views of the chain drive means on the bicycle in FIG. 1.
Figure 3:
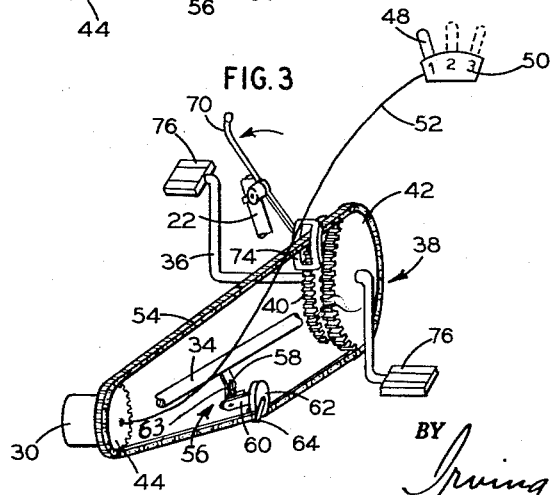

At the lower end of the seat support member a crank 36 is positioned in the frame. A double sprocket wheel 38 is mounted on the crank 36 and comprises a first sprocket wheel 40 and a second sprocket wheel 42. In FIG. 1 the second sprocket wheel which is on the outside is shown broken away to reveal the inner first sprocket wheel. The first and second sprocket wheels are formed as an integral unit with the first sprocket wheel being of a smaller diameter than and arranged concentrically with the second sprocket wheel. In FIGS. 2 and 3, for purposes of illustration, the first and second sprocket wheels 40, 42, respectively, are shown spaced apart, however, actually they are in side by side relationship.

A rear sprocket wheel 44 is positioned on the hub 30 of the rear wheel 28 and a conventional three speed gear mechanism (not shown) is disposed within the hub. Mounted on the handlebar 14 is a gear selector lever 48 and housing 50. By means of a cable 52 which extends along the frame from the gear selector lever 48 to the gear mechanism, the gears in the hub 30 can be shifted as desired.

An endless chain 54 shown schematically in FIGS. 2 and 3 extends over and engages the rear sprocket wheel 44 and alternatively, one of the first and second sprocket wheels 40 and 42, respectively. Because the chain 54 must have a sufficient circumference to travel over the rear sprocket wheel 44 and the larger second sprocket wheel 42, it will contain a certain amount of slack when it is engaged on the first sprocket wheel 40.

To take up the slack in the chain an idler assembly 56 is disposed on the frame and biased against the chain 54. The idler assembly 56 comprises a downwardly extending strut 58 attached to one of the chain stays 34. An arm 60 having an idler wheel 62 attached to its lower end is connected by spring means 63 to the strut 58. The spring means urge the arm 60 downwardly so that the idler wheel 62 rides against the chain taking up any slack that it may contain. A U-shaped guard loop 64 connected to the idler wheel 62 keeps the chain from sliding off the wheel.

Above the double sprocket wheel 38 on the seat support member 22 is a bracket 66. A lever arm 68 is pin connected to the bracket at about its mid-point. At its upper end lever arm 68 has a handle 70, and at its lower end it supports a yoke 72. The yoke has a rectangular opening 74 large enough to permit the chain 54 to pass through it. By pivoting the lever arm 68 on the bracket 66 the yoke 72 will move laterally displacing the chain from one to the other of the double sprocket wheels 38.

Pedals 76 are mounted on the crank for driving the double sprocket wheel 38 which in turn drives the rear sprocket wheel 44. Depending on the type of terrain and ground being traveled over on the bicycle 10, the chain 54 can be engaged with either the first or the second sprocket wheel and the gear mechanism shifted to any of its three speeds to attain the optimum driving condition. The means for shifting the gears and positioning the chain are arranged so that they are easily manipulated and do not interfere with the operation of the bicycle.

This combination of the double sprocket wheel and three speed gear mechanism permits six speed operation without any of the cumbersome features which would result if six speed operation were attempted with either a gear mechanism or a multiple crank sprocket arrangement alone. By using only a double sprocket wheel the problem of the chain being out of line between the crank and the rear sprocket is minimized.

While the bicycle drive means have been illustrated and described with a double crank sprocket wheel and a three speed gear mechanism, it will be understood that any multiple of sprocket wheels and gear mechanisms can be used to meet specific conditions.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. A bicycle comprising a frame, a front wheel and a rear wheel both mounted in said frame, said frame having a handlebar for steering said bicycle and a support member positioned between said front and rear wheels, a hub disposed in said rear wheel, a multiple speed gear mechanism disposed within said hub, a gear shift lever positioned on said handlebar, means disposed on said frame communicating between said gear shift lever and said gear mechanism for shifting gears therein, a crank positioned in said frame intermediate said front and rear wheels, a double sprocket wheel mounted on said crank and comprising a first sprocket wheel and a second sprocket wheel disposed in side by side relationship, said first sprocket wheel having a smaller diameter than and arranged concentrically with said second sprocket wheel, a rear sprocket wheel mounted on the hub of said rear wheel, an endless chain arranged to engage and pass over said rear sprocket wheel and alternatively one of said first and second sprocket wheels, means mounted on said frame and biased against said chain to maintain tension therein, a movably positionable lever arm pivotally mounted at approximately its mid-point on the support member of said frame, and means attached to the lower end of said lever arm and in communication with said chain wherein by selectively positioning said lever arm said chain can be alternatively disposed on said first and second sprocket wheels.

2. A bicycle comprising a frame, a front wheel and a rear wheel both mounted in said frame, said frame comprising a handlebar for steering said bicycle, an upwardly extending seat support member positioned between said front and rear wheels, and chain stay means extending between said rear wheel and the lower end of said seat support member, a hub disposed in said rear wheel, a three speed gear mechanism disposed within said hub, a gear shift lever positioned on said handlebar, a cable disposed on said frame and connected to and communicating between said gear shift lever and said gear mechanism for shifting gears therein, a crank positioned in said frame intermediate said front and rear wheels, an integral double sprocket wheel mounted on said crank and comprising a first sprocket wheel and a second sprocket wheel disposed in side by side relationship, said first sprocket wheel having a smaller diameter than and arranged concentrically with said second sprocket wheel, a rear sprocket wheel mounted on the hub of said rear wheel and having a diameter substantially smaller than said first sprocket wheel, an endless chain arranged to engage and pass over said rear sprocket wheel and alternatively one of said first and second sprocket wheels, an idler wheel assembly attached to said chain stay means and biased against said chain to maintain tension on the chain, a movably positionable upwardly extending lever arm pivotally mounted at approximately its mid-point on said seat support member, a yoke attached to the lower end of said lever arm and fitting over said chain wherein by selectively positioning said lever arm said chain can be alternatively disposed on said first and second sprocket wheels, and a pair of pedals oppositely disposed on and attached to said crank for imparting rotary motion to said double sprocket wheel which through the medium of said chain drives said rear sprocket wheel and in turn said rear wheel.

3. A bicycle comprising a frame, a front wheel and a rear wheel both mounted in said frame, said frame comprising a handlebar for steering said bicycle, an upwardly extending seat support member positioned between said front and rear wheels, and a chain stay means extending between said rear wheel and the lower end of said seat support member, a hub disposed in said rear wheel, a three speed gear mechanism disposed within said hub, a gear shift lever and housing positioned on said handlebar, a cable disposed on said frame and connected to and communicating between said gear shift lever and said gear mechanism for shifting gears therein, a crank positioned in said frame intermediate said front and rear wheels, an integral double sprocket wheel mounted on said crank and comprising a first sprocket wheel and a second sprocket wheel disposed in side by side relationship, said first sprocket wheel having a smaller diameter than and arranged concentrically with said second sprocket wheel, a rear sprocket wheel mounted on the hub of said rear wheel and having a diameter substantially smaller than said first sprocket wheel, an endless chain arranged to engage and pass over said rear sprocket wheel and alternatively one of said first and second sprocket wheels, an idler wheel assembly attached to said frame and comprising a strut attached to said chain stay means, an arm connected to said strut, an idler wheel attached to said arm, spring means in combination with said strut and arm urging said idler wheel into engagement with said chain, a loop guard attached to said idler wheel for preventing said chain from slipping off said idler wheel, a bracket mounted on said seat support member, an upwardly extending lever arm pivotally attached to said bracket at approximately its mid-point, a yoke having a rectangular opening therein for said chain to pass therethrough and connected to the lower end of said lever arm whereby when said lever arm is pivoted laterally about said bracket said yoke is also moved laterally for alternatively displacing said chain from one to the other of said first and second sprocket wheels, and a pair of pedals oppositely disposed on and attached to said crank for imparting rotary motion to said double sprocket wheel which through the medium of said chain drives said rear sprocket wheel and in turn said rear wheel.

References Cited in the file of this patent

UNITED STATES PATENTS

| | | |
|---|---|---|
| 2,187,368 | Todrys | Jan. 16, 1940 |
| 2,596,391 | Farinelli | May 13, 1952 |
| 2,895,576 | Schwerdhofer | July 21, 1959 |

FOREIGN PATENTS

| | | |
|---|---|---|
| 936,185 | France | Feb. 16, 1948 |